(12) United States Patent
Chandrashekar et al.

(10) Patent No.: US 11,624,449 B2
(45) Date of Patent: Apr. 11, 2023

(54) SHUTTLE VALVE POPPET MECHANISM

(71) Applicant: The Boeing Company, Chicago, IL (US)

(72) Inventors: Vinay Kumar Tumkur Chandrashekar, Bengaluru (IN); Elias Eliot, Bengaluru (IN)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 17/380,627

(22) Filed: Jul. 20, 2021

(65) Prior Publication Data

US 2023/0021842 A1 Jan. 26, 2023

(51) Int. Cl.
| | |
|---|---|
| *F16K 17/26* | (2006.01) |
| *F15B 15/02* | (2006.01) |
| *F16K 11/044* | (2006.01) |
| *G05D 23/13* | (2006.01) |
| *F16K 31/56* | (2006.01) |

(52) U.S. Cl.
CPC ............. *F16K 17/26* (2013.01); *F15B 15/02* (2013.01); *F16K 11/044* (2013.01); *F16K 31/566* (2013.01); *G05D 23/1313* (2013.01); *Y10T 137/2521* (2015.04)

(58) Field of Classification Search
CPC ......... Y10T 137/2521; Y10T 137/2564; Y10T 137/2567; Y10T 137/2569; F16K 31/56; F16K 31/566; F16K 11/044
See application file for complete search history.

(56) References Cited

U.S. PATENT DOCUMENTS

| | | | | |
|---|---|---|---|---|
| 2,654,564 | A * | 10/1953 | Pech ...................... | F16K 31/56 251/75 |
| 3,508,568 | A * | 4/1970 | Kowalski ........... | G05D 16/0663 137/516.25 |
| 3,533,431 | A * | 10/1970 | Kuenzel ................ | F16K 11/044 267/181 |
| 3,592,215 | A * | 7/1971 | Davis .................... | F17C 13/045 137/112 |
| 4,354,518 | A * | 10/1982 | Kuroda ................ | B60T 11/326 137/112 |
| 4,493,435 | A * | 1/1985 | Hartley ................. | F16K 31/365 222/64 |
| 4,923,168 | A * | 5/1990 | Murata ............... | F16K 11/0704 251/75 |
| 4,953,579 | A * | 9/1990 | Phillips ................. | F16K 31/566 91/193 |
| 2015/0337979 | A1* | 11/2015 | Murata ................. | F16K 31/566 137/625.48 |

* cited by examiner

*Primary Examiner* — Robert K Arundale
(74) *Attorney, Agent, or Firm* — Kolisch Hartwell, P.C.

(57) ABSTRACT

An apparatus for directing fluid flow is disclosed, including a valve structure having a chamber, a main port, a first port, and a second port, each of the ports being connected to the chamber. A poppet structure in the chamber is moveable between a first position blocking the first port and a second position blocking the second port. A first compliant member connecting the poppet structure to an inner wall of the chamber, is configured to alternate application of forces to the poppet structure, in opposite directions, between the first and second positions.

20 Claims, 9 Drawing Sheets

SHUTTLE VALVE POPPET MECHANISM

BACKGROUND

A shuttle valve, also referred to as a directional control valve (DCV) or hydraulic switching valve or an OR gate in pneumatic logic, may include multiple ports and various configurations for connections between the ports. A simple shuttle valve includes a first fluid inlet port, a second fluid inlet port, and an outlet port, with a moving element in the form of a spool or a poppet. Shuttling of the poppet between the first and second inlet ports facilitates alternating fluid paths between the first or second inlet ports and the outlet port depending on a pressure differential between the ports. In some examples, a spring-biased ball and detent mechanism is employed for holding the poppet at the desired inlet port and for shuttling the poppet between the first and second inlet ports. However, the multiple parts of the detent mechanism can lead to complexity and cost in manufacturing processes. Also, since the detent mechanism is prone to wear, tear or jam, an operational efficiency of the valves may be decreased.

SUMMARY

The present disclosure provides systems, apparatuses, and methods relating to a shuttle valve poppet mechanism. In some examples, an apparatus for directing fluid flow may include a valve structure having a chamber, a main port, a first port, and a second port, each of the ports being connected to the chamber. The apparatus may further include a poppet structure in the chamber moveable between a first position blocking the first port and a second position blocking the second port, and a first compliant member connecting the poppet structure to an inner wall of the chamber, and configured to alternate application of forces to the poppet structure, in opposite directions, between the first position and the second position.

In some examples, an apparatus for directing fluid flow may include a valve structure having a chamber, a main port, a first port, and a second port, each of the ports being connected to the chamber. The apparatus may further include a poppet structure in the chamber moveable between a first position blocking the first port and a second position blocking the second port, and a first over-center spring mechanism connecting the poppet structure to an inner wall of the chamber, and configured to alternate application of forces to the poppet structure, in opposite directions, between the first position and the second position.

In some examples, a method of controlling fluid flow through a valve device may include exerting a first force on a poppet structure, maintaining the poppet structure in a first position blocking fluid flow through a first port in a chamber of a valve device, the first force being exerted by a compliant member connecting the poppet structure to an inner wall of the chamber. The method may further include moving the poppet structure away from the first position toward a second position blocking fluid flow through a second port, by overcoming the first force by a counter force exerted on the poppet structure by a threshold level of fluid pressure generated by fluid flow from the first port.

Features, functions, and advantages may be achieved independently in various examples of the present disclosure, or may be combined in yet other examples, further details of which can be seen with reference to the following description and drawings.

DETAILED DESCRIPTION

Various aspects and examples of an apparatus for directing fluid flow, including a shuttle valve poppet mechanism, and related methods, are described below and illustrated in the associated drawings. Unless otherwise specified, a shuttle valve poppet mechanism in accordance with the present teachings, and/or its various components may, but are not required to, contain at least one of the structures, components, functionalities, and/or variations described, illustrated, and/or incorporated herein. Furthermore, unless specifically excluded, the process steps, structures, components, functionalities, and/or variations described, illustrated, and/or incorporated herein in connection with the present teachings may be included in other similar devices and methods, including being interchangeable between disclosed examples. The following description of various examples is merely illustrative in nature and is in no way intended to limit the disclosure, its application, or uses. Additionally, the advantages provided by the examples described below are illustrative in nature and not all examples provide the same advantages or the same degree of advantages.

This Detailed Description includes the following sections, which follow immediately below: (1) Overview; (2) Examples, Components, and Alternatives; (3) Illustrative Combinations and Additional Examples; (4) Advantages, Features, and Benefits; and (5) Conclusion. The Examples, Components, and Alternatives section is further divided into subsections A through D, each of which is labeled accordingly.

Overview

In general, an apparatus for directing fluid flow in accordance with the present teachings includes a valve structure including a compliant poppet mechanism facilitated by a compliant member. The compliant member includes one or more adjacent compliant sections arranged radially around an inner ring member and extending to a concentric outer ring member. The inner ring member includes an aperture to fixedly receive a movable poppet, and the outer ring member is configured to attach to the valve structure. The compliant sections are configured to resiliently deform within an elastic range, in response to a threshold level of applied fluid pressure differential on the poppet. Alternate application of forces to the poppet, in opposite directions provides precise shuttling of a poppet between first and second inlet ports of the valve structure for directing fluid to an outlet port.

Examples, Components, and Alternatives

The following sections describe selected aspects of exemplary apparatus for directing fluid flow, including a shuttle valve poppet mechanism, as well as related systems and/or methods. The examples in these sections are intended for illustration and should not be interpreted as limiting the entire scope of the present disclosure. Each section may include one or more distinct examples, and/or contextual or related information, function, and/or structure.

A. Illustrative Apparatus for Directing Fluid Flow

As shown in FIGS. 1-5C, this section describes an illustrative fluid flow directing apparatus 110 in accordance with the present teachings. Apparatus 110 is an example of an apparatus for directing fluid flow as described above.

Figure 1:
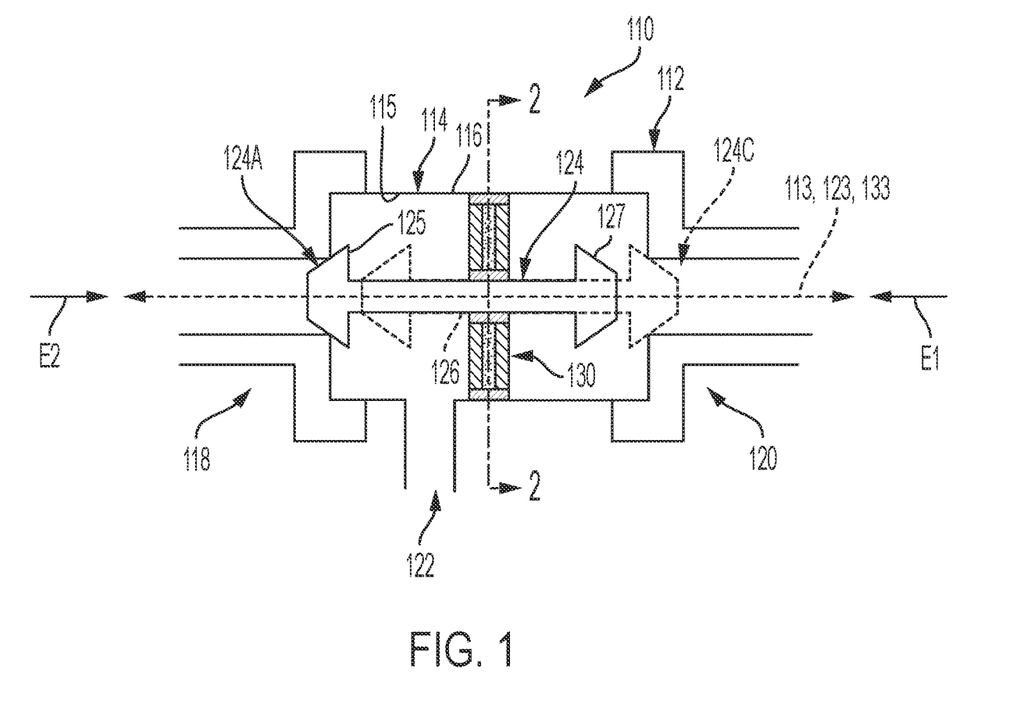
FIG. 1 is a schematic diagram of an illustrative apparatus for directing fluid flow, including a single compliant member in accordance with aspects of the present disclosure.

FIG. 1 is a schematic cross-sectional view of fluid flow directing apparatus 110. Apparatus 110 includes a valve structure 112 having a chamber 114 with a chamber wall 116. A first port 118 and an opposite second port 120 are connected to chamber 114 for facilitating alternate entry of fluid into chamber 114 in opposing directions.

As shown in FIG. 1, chamber 114 has a cylindrical structure, and a longitudinal axis 113 extends centrally through first and second ports 118, 120. In the present example, a main port or outlet port 122 is connected to the chamber orthogonal to longitudinal axis 113 and between first and second ports 118, 120. In other examples, various other geometries for chamber 114 and relative orientations between the inlet and outlet ports may be contemplated. In some examples, first and second ports 118, 120 may be connected to two different fluid sources. In some examples, first port 118 may be connected to outlet port 122 for normal operations, and second inlet port 120 may be an emergency port, activated only in a valve operation emergency.

A moving element in the form of a poppet structure or a poppet 124 is received coaxially within chamber 114. Poppet 124 is configured to move between a first position 124A blocking fluid entry from first port 118 and a second position 124C blocking fluid entry from second port 120. Poppet 124 includes a poppet shaft 126 along a longitudinal axis 123. A longitudinal axis 123 extends along poppet shaft 126, and is in overlapping alignment with longitudinal axis 113. Alternatively, axes 113, 123 may be non-overlapping, based on relative positioning of outlet and inlet ports 122, 118, 120 within chamber 114. In the depicted example, as shown in FIG. 1, first and second poppet heads 125, 127 are attached to opposite ends of shaft 126 along longitudinal axis 123. In the present example, poppet heads 125, 127 have a trapezoidal or frustoconical cross-sectional shape. Alternatively, poppet heads 125, 127 may have any other geometric shape of appropriate size to block fluid flow from a selected inlet port 118 or 120. Additionally, poppet heads 125, 127 may be configured to receive a seal member such as an O-ring, an annular gasket or the like.

A compliant member or biasing assembly 130 connects poppet 124 to an inner wall 115 of chamber 114. Compliant member 130 may also be described as an over-center spring mechanism. A central axis 133 extends through compliant member 130, and is in overlapping alignment with longitudinal axis 113. Compliant member 130 provides for precise shuttling of poppet 124 between first and second positions 124A, 124C.

Compliant member 130 is configured to alternate application of forces to poppet 124 exerted by fluid flow through first or second inlet ports 118, 120 between opposing directions. For example, in response to fluid flow from second port 120, compliant member 130 applies a first force on poppet 124 in a first direction E1. If the force in direction E1 is greater than force from fluid in port 118, poppet 124 moves to block fluid flow from first port 118, and to allow fluid flow between second port 120 and outlet port 122. Alternatively, in response to fluid flow from first port 118, compliant member applies a second force or counterforce on poppet 124 in a second direction E2, opposite to direction E1. If the force in direction E2 is greater than the force in direction E1, then poppet 124 moves to block fluid flow from second port 120, and to allow fluid flow between first port 118 and outlet port 122. In other words, compliant member 130 facilitates shuttling of poppet 124 between first and second inlet ports 118, 120, for allowing alternating fluid flow paths between either of first or second ports 118, 120, and outlet port 122.

Figure 2:
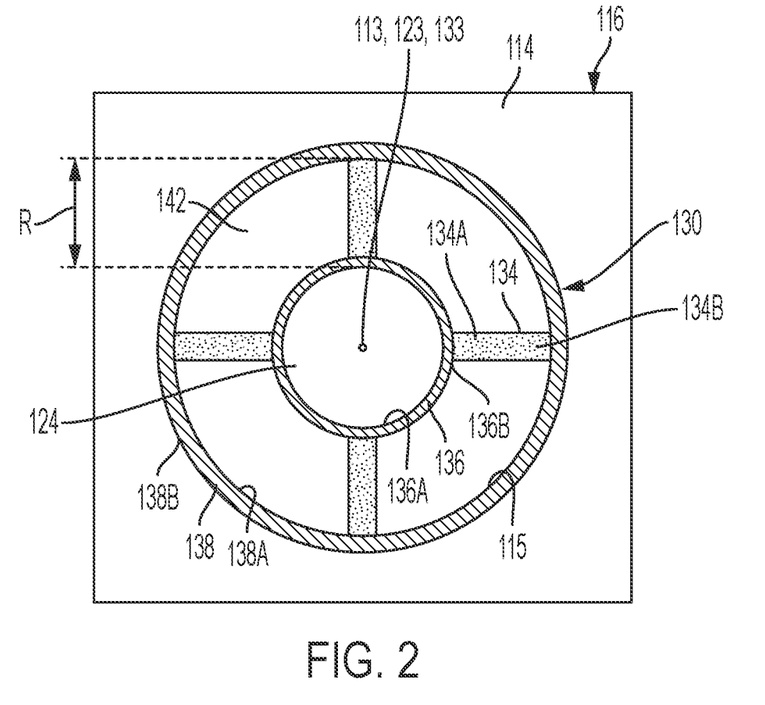
FIG. 2 is a cross-sectional view of the apparatus for directing fluid flow, along plane 2-2 in FIG. 1.
Figure 3A:
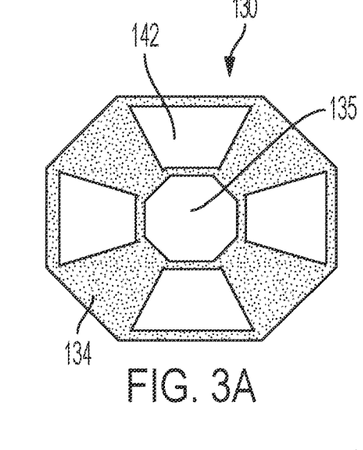
FIGS. 3A-3G are schematic cross-sectional views of examples of the compliant member of FIG. 1.
Figure 3B:
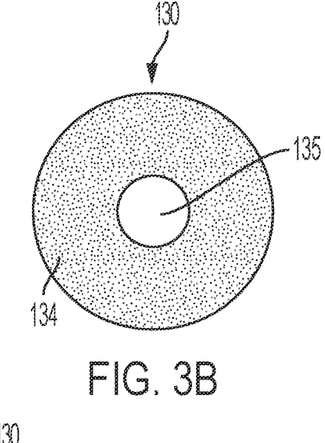
Figure 3C:
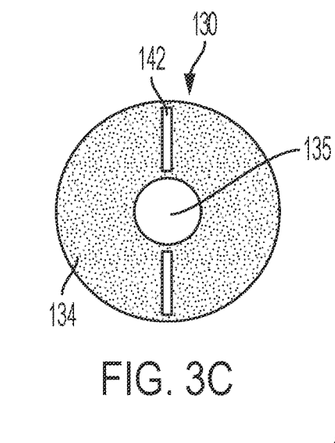
Figure 3D:
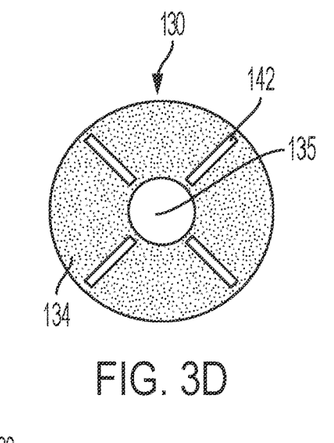
Figure 3E:
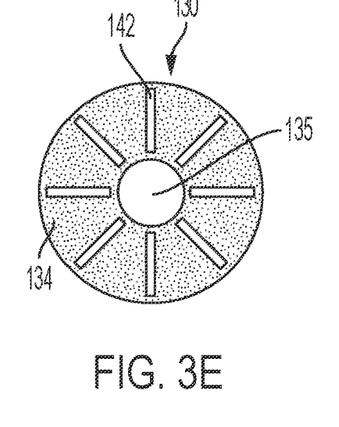
Figure 3F:
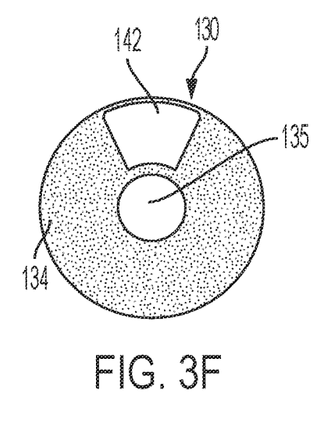
Figure 3G:
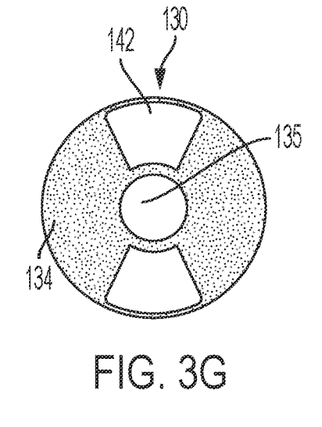

FIG. 2 is a cross-sectional view of fluid flow directing apparatus 110 along plane 2-2 of FIG. 1. As described earlier, compliant member 130 is connected between inner wall 115 of chamber 114 and poppet structure 124. Compliant member 130 includes a plurality of compliant links, over-center spring devices, or compliant sections 134, radially arranged around a central inner ring member 136, and extending to a concentric outer ring member 138. In the present example, the compliant member includes four compliant sections 134. Inner ring member 136 and outer ring member 138 circumferentially or peripherally surround central axis 133. A radial distance between the inner and outer ring members may be defined as radial gap R for compliant member 130. Outer ring member 138 is configured to be fixed relative to inner wall 115 of chamber 114. Outer ring member 138 may either be directly connected to inner wall 115, or connected indirectly through a suitable stationary support structure. Inner ring member 136 is configured to be fixed relative to poppet structure 124, either by direct connection or via a suitable support structure.

As shown in FIG. 2, inner ring 136 has a first surface or inner surface 136A and a second surface or outer surface 136B. Outer ring 138 has a third surface or inner surface 138A and a fourth surface or outer surface 138B. Inner surface 136A of inner ring 136 may be securely fixed to poppet 124. Outer surface 138B of outer ring 130 may be securely fixed to inner wall 115 of chamber 114. Further, each of the four compliant sections 134 includes a proximal end 134A and a distal end 134B, relative to central axis 133. Proximal end 134A and distal end 1346 of compliant sections 134 are securely fixed to the outer surface of inner ring 136B and the inner surface of outer ring 138A, respectively. Connection techniques may include adhesive bonding or any method sufficient to fix compliant sections 134 at desired spots on inner and outer rings 136, 138 without adversely affecting flexibility of compliant sections 134.

Compliant sections 134 may also be manufactured monolithically together with inner and/or outer ring members, for example, by additive manufacturing as explained further below. A variety of raw materials, ranging from polymers (e.g. PVC, PEEK), composites, and metals (e.g. steel, aluminum, titanium) may be utilized for fabricating compliant member 130. Physical characteristics such as elasticity range, stiffness, stress, and fatigue of the raw materials may influence the shuttling force of compliant members 130. In examples employing metal-based compliant sections, inner and outer rings 136, 138 may be welded to compliant sections 134 in accordance with conventional welding procedures. Each compliant section 134 may be flat, or may have any other suitable cross-sectional shape.

As shown in FIGS. 3A to 3G, compliant sections 134 may be directly connected to one or more adjacent compliant sections or may be spaced from one another by spacings or slits 142. The plurality of compliant sections 134 may be arranged symmetrically or asymmetrically between inner and outer rings 136, 138. In general, compliant member 130, including inner ring member 136 and outer ring member 138, may have any appropriate geometry, including any curved or polygonal shape. In the example shown in FIG. 3A, compliant member 130 has octagonally shaped ring members, with compliant sections 134 and slits 142 having trapezoidal cross-sectional shapes. In another example shown in FIG. 3B, compliant member 130 includes a compliant section 134 forming a continuous monolithic structure around central aperture 135. In examples shown in FIGS. 3C-3E, compliant member 130 includes compliant sections 134 separated by two, four, or eight slits 142 arranged around central aperture 135, respectively. In examples shown in FIGS. 3F-3G, compliant member 130 includes single or double broad slits 142 between compliant sections 134 arranged around central aperture 135, respectively.

An increase or decrease in the number of compliant sections 134 or slits 142 between the compliant sections, may affect a force, or other performance specifications, needed to actuate compliant member 130. For example, the number of slits 142 between compliant sections 134 may be inversely proportional to the force required to actuate compliant member 130. Additionally, or alternatively, increasing the surface area of compliant sections may increase the force required to actuate the compliant member. Performance of compliant member 130 or, in other words, a shuttling response of poppet 124 and an ability to hold poppet 124 in a particular position based on a fluid pressure difference are dependent on a number of variables including material composition, thickness, number of compliant sections, spacing between adjacent compliant sections, and overall surface area of compliant sections, among other variables. Thus, there are many ways to tune a particular compliant member for a particular poppet valve configuration. A compliant member may be tuned for a particular purpose in the initial manufacturing process, or may also be tuned later by adding or removing compliant section material from a given compliant member.

Figure 4A:
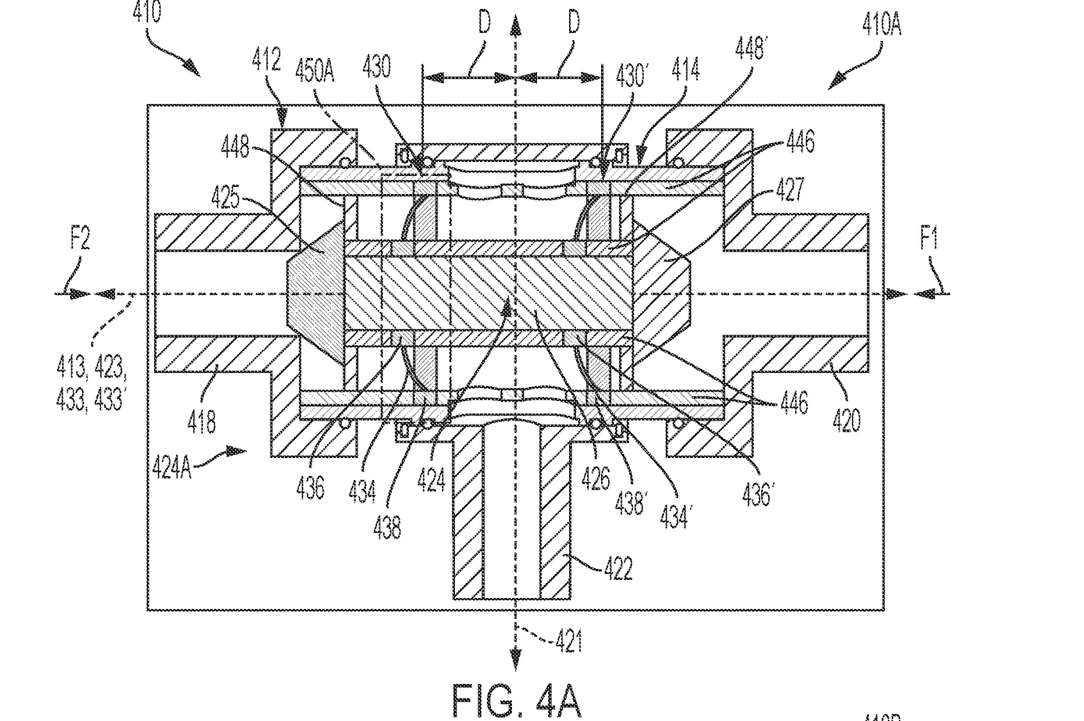
FIGS. 4A-4C are schematic cross-sectional views of operational stages of an apparatus for directing fluid flow, including a pair of compliant members.
Figure 4B:
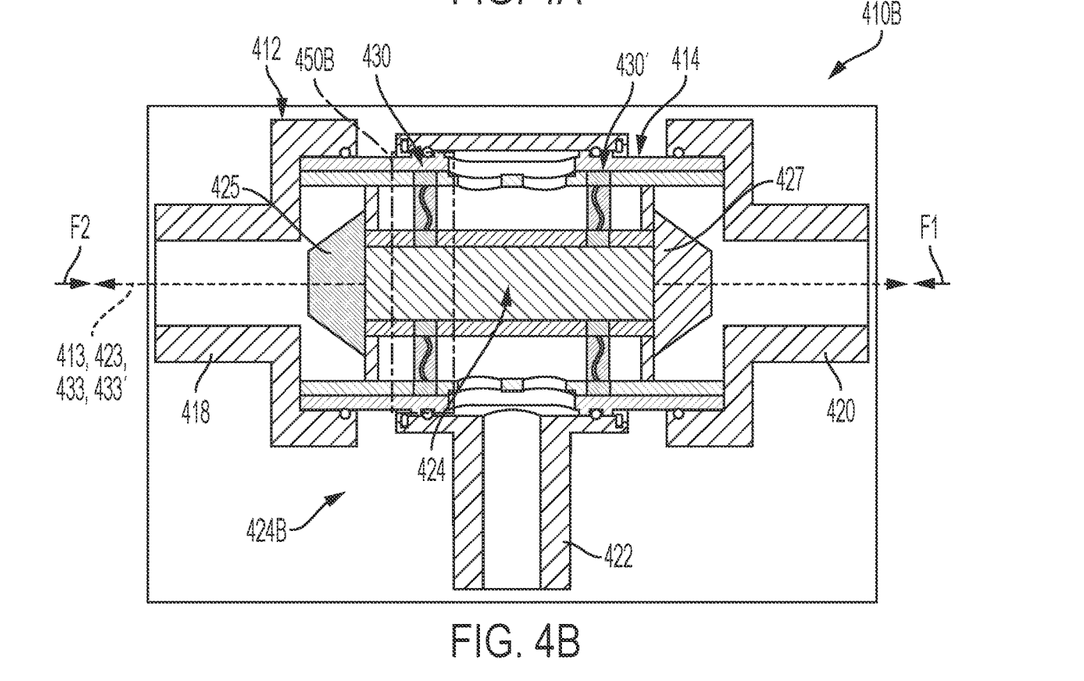
Figure 4C:
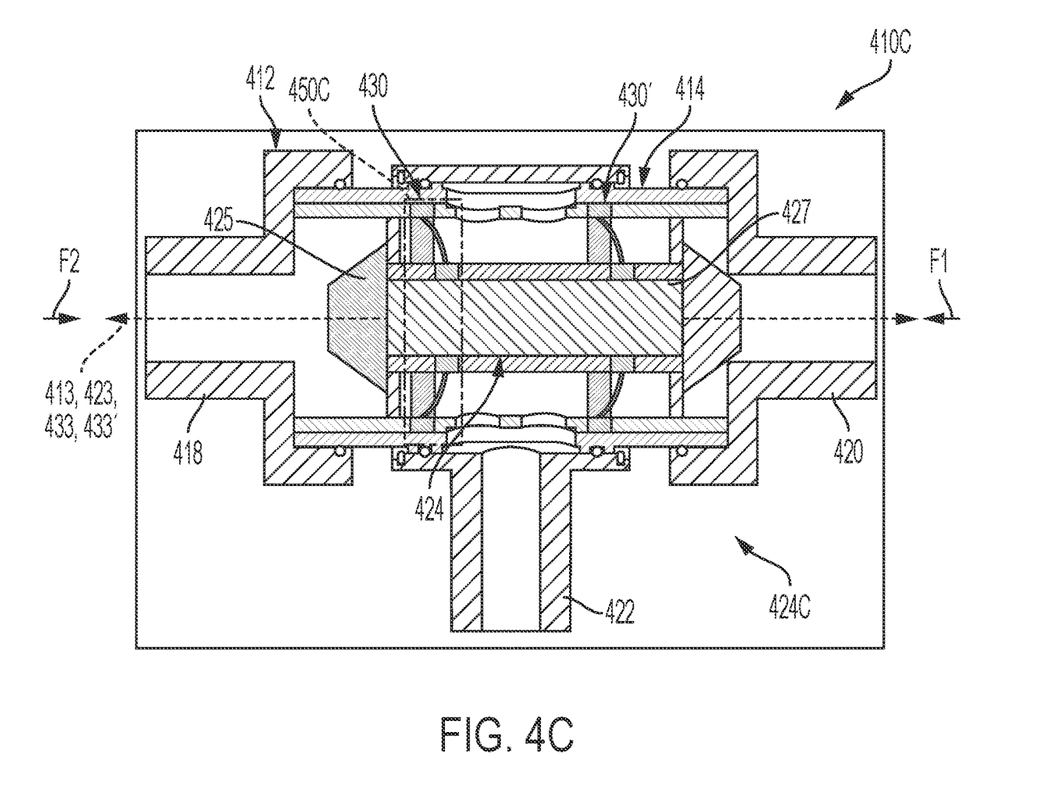

FIGS. 4A-4C represent schematic cross-sectional views of operational stages of a fluid flow directing apparatus 410. Apparatus 410 is another example of a shuttle valve poppet mechanism as described above. Apparatus 410 is similar to apparatus 110, described above. Corresponding parts are numbered the same as in FIG. 1 except in the 400 to 500 range instead of the 100 to 200 range.

Apparatus 410 includes a valve structure 412 having a chamber 414. A first port 418 and an opposite second port 420 are connected to chamber 414 for facilitating entry of fluid into chamber 414 in opposing directions. As shown in FIG. 4A-4C, chamber 414 has a cylindrical structure, and a longitudinal axis 413 extends centrally through first and second ports 418, 420. In the present example, a main port or outlet port 422 is connected to chamber 414, along an axis 421 extending orthogonal to longitudinal axis 413, midway between first and second ports 418, 420.

Poppet structure or poppet 424 is received coaxially within chamber 414. Poppet 424 is configured to move between a first position 424A blocking fluid entry from first port 418, as shown in FIG. 4A, and a second position 424C blocking fluid entry from second port 420, as shown in FIG. 4C, through an intermediate position 424B, as shown in FIG. 4B. Poppet 424 includes a poppet shaft 426 extending along longitudinal axis 423 in overlapping alignment with axis 413. First and second trapezoidal or frustoconical shaped poppet heads 425, 427 are attached to opposite ends of shaft 426 along longitudinal axis 423.

Apparatus 410 includes a pair of compliant members, 430, 430' for facilitating movement of poppet 424 between first port 418 and second port 420 of chamber 414. Compliant members 430, 430' are configured to synchronously alternate application of forces to poppet 424 in opposite directions. First and second compliant members 430, 430' are examples of compliant member 130 described above. As shown in FIGS. 4A-4C, and 5A-5C, inner ring members 436, 436' of compliant members 430, 430' respectively, are securely attached to movable support or poppet 424. Likewise, outer ring members 438, 438' of each of compliant members 430, 430' respectively, are securely attached to stationary support or valve structure 412.

Each compliant member 430, 430' includes a plurality of compliant sections or links 434, 434' radially arranged around respective inner rings 436, 436' and extending to respective outer rings 438, 438'. A pair of compliant sections 434, 434' for each compliant member 430, 430' may be visualized in cross-sectional views as depicted in FIGS. 4A-4C. First and second compliant members 430, 430' are configured to be concentric, and their central axis 433, 433' are in overlapping alignment with longitudinal axes 413, 423. In the present example, as shown in FIG. 4A, first and second compliant members 430, 430' are spaced apart along longitudinal axis 423 of poppet shaft 426 such that they are equidistant by a distance D from axis 421 in opposing directions.

As seen in FIGS. 4A-4C, and 5A-5C, inner rings 436, 436' of compliant members 430, 430' are sandwiched between layers of lining or packaging material 446 attached to poppet 424. Similarly, outer rings 438, 438' of compliant members 430, 430' are sandwiched between layers of lining or packaging material 446 attached to inner wall of chamber 415. In general, packaging material 446 may assist in constraining any undesired sliding displacement of inner rings 436, 436' on poppet 424, or that of outer rings 438, 438', on inner wall 415 of chamber 414, during operational use of fluid flow directing apparatus 410.

Furthermore, apparatus 410 includes a pair of perforated support rings 448, 448', movably received within lining material 446 of chamber 414 for supporting poppet 424. As shown in FIGS. 4A-4C, support rings 448, 448' are fixedly attached to long base sides of trapezoidal or frustoconical shaped poppet heads 425, 427 respectively, and are configured to move freely along with poppet 424. First and second compliant members 430, 430' function cooperatively in conjunction with support rings 448, 448' to establish shuttling motion of poppet 424 along longitudinal axis 413 within fluid flow directing apparatus 410.

FIG. 4A shows a first stage 410A of apparatus 410. A fluid pressure applied in a first direction F1 along longitudinal axis 413 of valve structure 412 at second port 420 is more than at first port 418, and the pressure difference is more than a preset threshold. Hence poppet 424 is shuttled such that poppet head 425 blocks first port 418, thereby blocking fluid entry through first port 418. At this stage, poppet 424 is in a first position 424A. Consequently, second port 420 and outlet port 422 are connected for fluid flow.

In response to applied fluid pressure in a second direction F2 along longitudinal axis 413 of valve structure 412, in a second stage 410C as shown in FIG. 4C, the pressure at second port 420 is less than the pressure at first port 418, and the pressure difference is more than the preset threshold. Hence poppet 424 is shuttled such that poppet head 427 blocks second port 420, thereby blocking fluid entry through second port 420. At this stage, poppet 424 is in a second position 424C. Consequently, first port 418 and outlet port 422 are connected for fluid flow. During the shuttling of poppet 424 between first and second positions 424A, 424C, valve structure 412 may go through a short-lived intermediate transitory stage 410B, as shown in FIG. 4B.

First and second compliant members 430, 430' cooperatively facilitate the shuttling of poppet 424 between first and second ports 418, 420 based on the applied fluid pressure. Additionally, compliant members 430, 430' facilitate holding of poppet 424 in a desired inlet port 418 or 420 without fluttering or premature shuttling. For simplicity of description, portions 450A-C of FIGS. 4A-4C, including compliant member 430 are depicted as exploded views in FIGS. 5A-5C.

Portions 450A-C represent three different configurations of compliant member 430 at three different operational stages of apparatus 410A-C, respectively described above. Specifically, FIGS. 5A-5C illustrate movement of inner ring 436 relative to outer ring 438, mediated by compliant deformations of compliant sections 434, as poppet 424 is shuttled between first and second positions 424A, 424C.

Figure 5A:
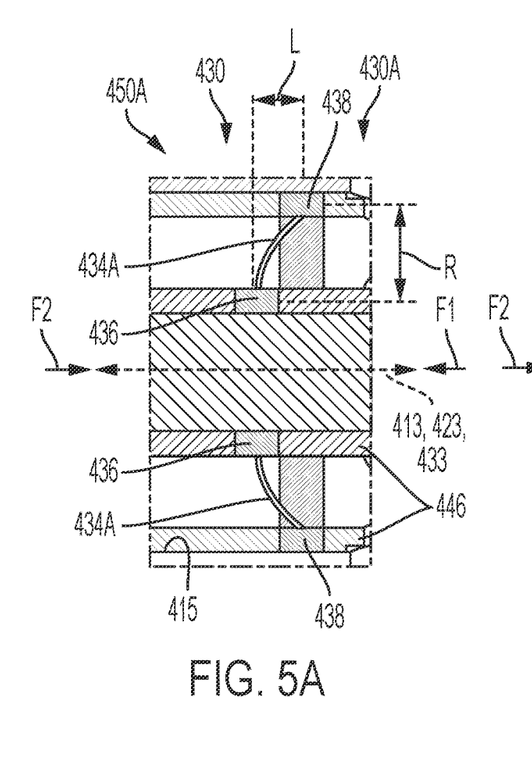
FIGS. 5A-5C are exploded views of portions of FIGS. 4A-4C, respectively.
Figure 5B:
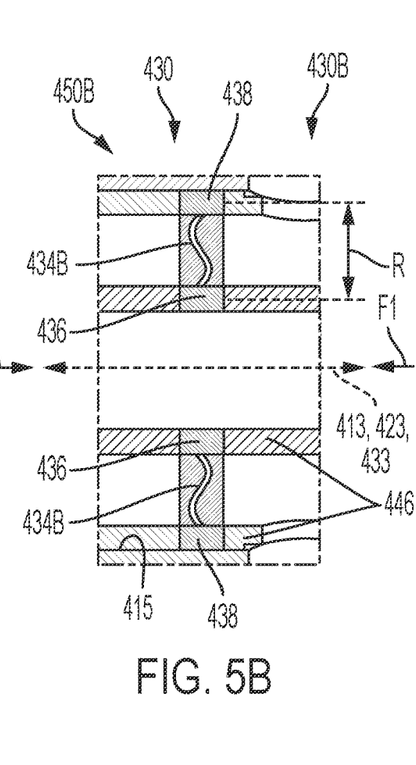
Figure 5C:
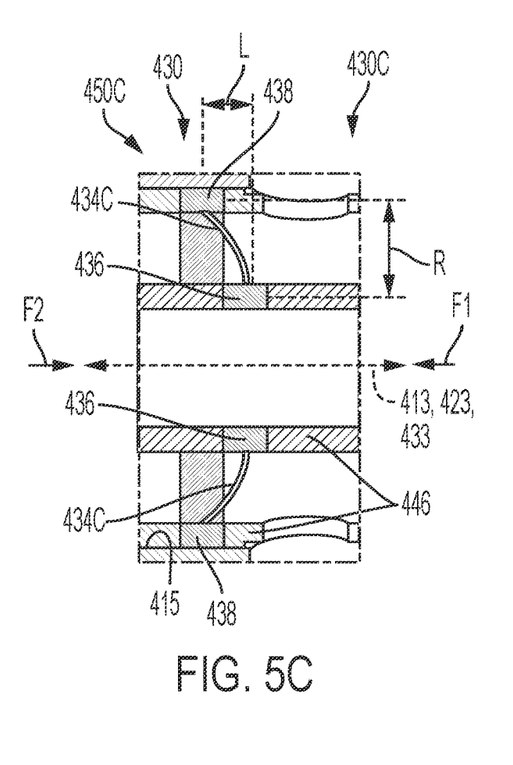

As seen in FIG. 5A, first configuration 430A of compliant member 430, has compliant sections 434 in a first laterally extended form 434A. In first configuration 430A, inner ring member 436 is displaced by an off-set or lateral displacement L in direction F1 along central axis 413 relative to outer ring member 438. In response to an applied pressure in second direction F2 along central axis 433, first configuration 430A moves into a short-lived transitory intermediate configuration 430B. Compliant sections 434 are in compressed form 434B, and inner ring member 436 is in proper alignment with outer ring member 438. Further, in response to applied fluid pressure in second direction F2 along central axis 433, short-lived transitory configuration 430B moves into second configuration 430C of compliant member 430. Compliant sections 434 are in second laterally extended form 434C, and inner ring member 436 is displaced by lateral displacement L along axis 413, relative to outer ring member 438, in an opposite direction relative to first configuration 430A.

Likewise, second configuration 430C is configured to move back to first configuration 430A through transitory configuration 430B in response to applied fluid pressure in opposite direction F1 along longitudinal axis 413. A flexible property of compliant sections 434 facilitates compliant member 430 to switch between first and second configurations 430A, 430C repeatedly with minimal stress or fatigue. The compliant mechanism for compliant member 430 may also be described as an over-center spring mechanism for inner ring member 436 relative to outer ring member 438 in response to applied fluid pressures in opposing directions.

B. Illustrative Method of Controlling Fluid Flow

This section describes steps of an illustrative method for controlling fluid flow through a valve structure. Aspects of an apparatus for directing fluid flow, including a valve structure, a poppet, and a compliant member may be utilized in the method steps shown in FIG. 6. Where appropriate, reference may be made to components and systems that may be used in carrying out each step. These references are for illustration and are not intended to limit the possible ways of carrying out any particular step of the method.

Figure 6:
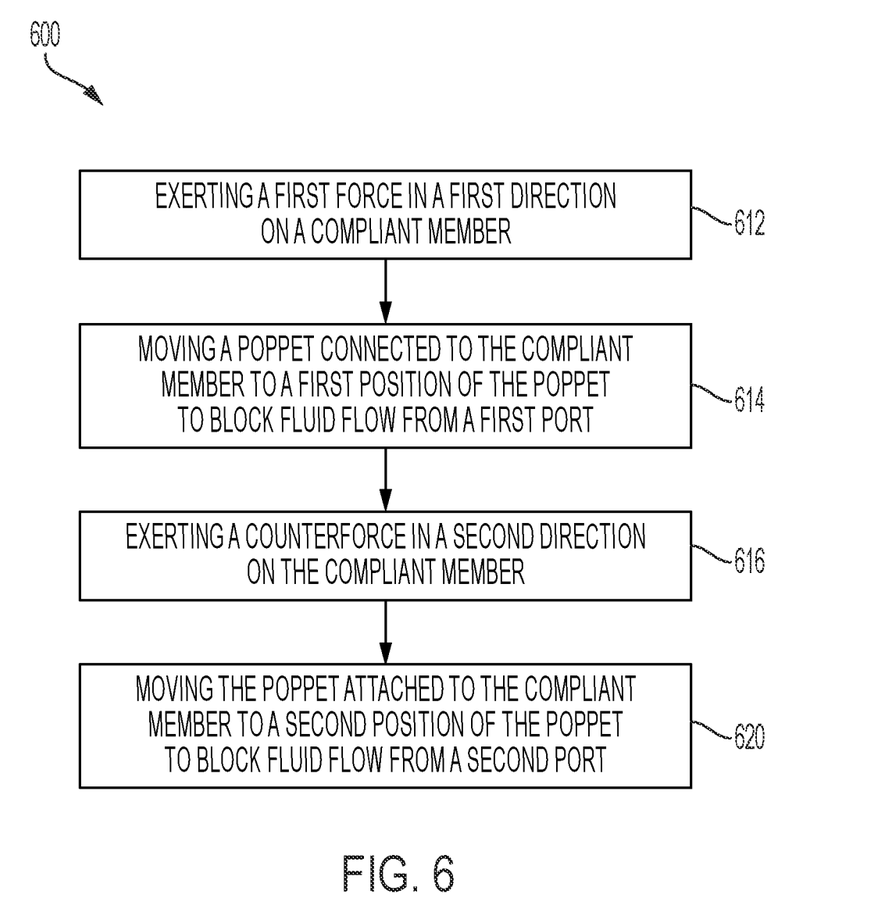
FIG. 6 is a flow chart depicting steps of an illustrative method of controlling fluid flow through a valve device according to the present teachings.

FIG. 6 is a flowchart illustrating steps performed in an illustrative method, and may not recite the complete process or all steps of the method. Although various steps of method 600 are described below and depicted in FIG. 6, the steps need not necessarily all be performed, and in some cases, may be performed simultaneously or in a different order than the order shown.

Method 600 of controlling fluid flow includes employing a compliant member to guide motion of a poppet between a first port and a second port, in response to applied fluid pressure within a valve structure. The compliant member provides for selectively facilitating a fluid flow path between either of the first or second ports, and an outlet port.

Step 612 includes exerting a first force in a first direction on the compliant member toward a first port. The first force may be exerted by a fluid pressure generated by fluid flow from a second port of the valve structure.

Step 614 includes moving the poppet connected to the compliant member in the first direction toward a first position blocking the first port in response to the first force. Continuation of step 614 includes maintaining the poppet at the first position, blocking fluid flow from the first port of the valve structure, and thereby connecting the second port to the outlet port and allowing fluid flow between the second port and the outlet port.

Step 616 includes exerting a counterforce in a second direction, opposite to the first direction, on the compliant member. The counterforce may be exerted by a threshold level of fluid pressure generated by fluid flow from the first port of the valve structure to overcome the first force.

Step 620 includes moving the poppet attached to the compliant member to a second position blocking fluid flow from the second port of the valve structure, thereby, connecting the first port to the outlet port and allowing fluid flow between the first port and the outlet port.

C. Illustrative Apparatus and Method for Additive Manufacture

Figure 7:
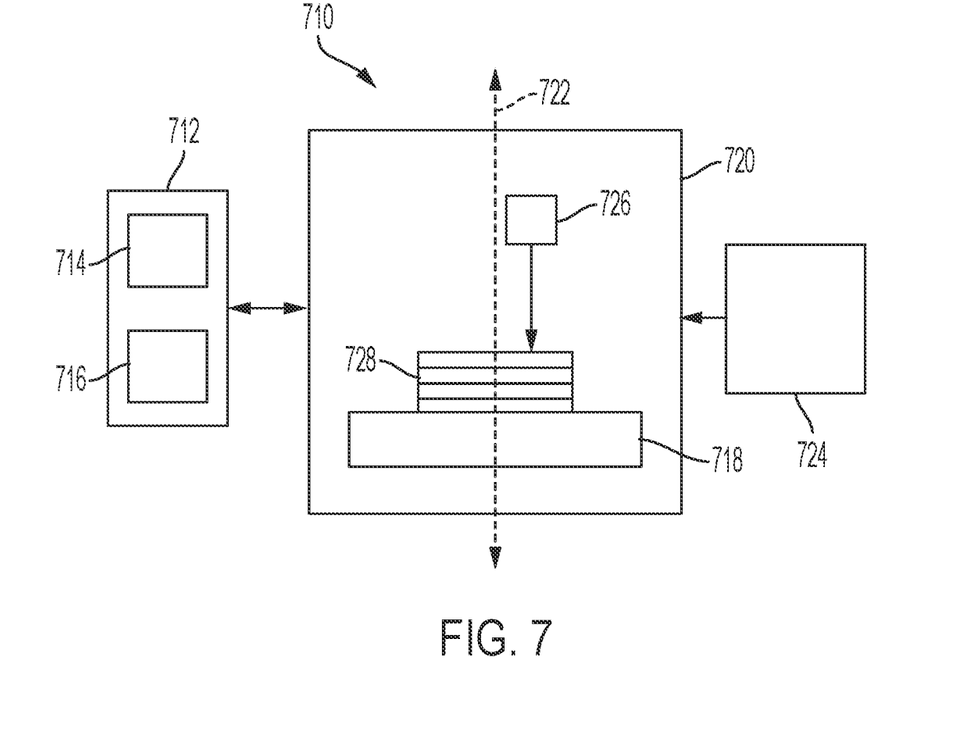
FIG. 7 is a schematic diagram of an illustrative apparatus for additive manufacturing of the compliant member of FIG. 1.

This section describes aspects of an illustrative additive manufacturing device depicted in FIG. 7, which may be utilized in an additive manufacturing method to manufacture compliant members and/or other structures used in valve assemblies described above.

A first step of an additive manufacturing method includes receiving digital information describing an ordered plurality of layers. The digital information may be received by a computer controller 712 of an additive manufacturing device 710 as depicted in FIG. 7. The additive manufacturing device may also be referred to as a printer, or a fabricator. The computer controller 712 may comprise any data processing system configured to receive digital design information and control functions of printer 710. The illustrative computer controller shown in FIG. 7 includes a processor 714 for controlling printer functions and memory 716 for storing received data.

The received information may include geometric data and/or design details for a plurality of two-dimensional patterns that constitute layers of a three-dimensional object, where the three-dimensional object is a workpiece 728 to be manufactured. In some examples, workpiece 728 may be a compliant member, as described above. The layers may also be described as cross-sections or slices. The plurality of layers is ordered, such that the layers may be numbered or organized from a first layer to a last layer.

A next step includes depositing raw material on a build platform 718 located in a building environment 720 of printer 710. The build platform may comprise a support moveable by computer controller 712 along a manufacturing axis 722. The build platform may have a planar surface perpendicular to manufacturing axis 722.

The raw material may be any material appropriate to additive manufacturing, typically a fluid or powder and including but not limited to photopolymer resin, thermoplastic, plaster, ceramic, and metal. The material may be distributed from a raw material source 724 such as a hopper, a tank, or a powder source. For example, nylon powder may be swept from a powder source onto a powder bed of build platform 718 by a brush arm actuated by computer controller 712.

The raw material may be distributed evenly over build platform 718, or may be deposited in a selected pattern. Depositing may be done under control of computer controller 712. In some examples, build platform 718 is submerged in raw material and depositing may be accomplished by gravity or fluid pressure. In some examples, a print head 726 connected to raw material source 724 deposits the raw material in a pattern corresponding to the first layer of the ordered plurality of layers.

A next step includes altering the raw material to produce the first layer. In other words, a physical change is induced in the deposited material, according to the design information describing the first layer of the ordered plurality of layers and as directed by the computer controller 712, to realize the first layer as a physical object on the build platform.

The material may be acted on by a print head 726 of printer 710, controlled by computer controller 712. For example, the print head may include a laser that cures a photopolymer by exposure to light or sinters a metal powder by exposure to heat. The print head may be directed by computer controller 712 to follow a path delineated in the received digital information for the first layer, and/or a path calculated by processor 714 based on the received digital information.

A next step includes repositioning the build platform. In some examples, build platform 718 starts a selected distance from print head 726. The selected distance may be determined by the procedures performed by the print head. Subsequent to production of a layer, the build platform may be repositioned by computer controller 712 along manufacturing axis 722 away from print head 726 by the layer's thickness. That is, the build platform may be moved such that a top surface of the produced layer is the selected distance from print head 726.

In some examples, build platform 718 starts in alignment with another element of printer 710, such as a raw material distribution component. Subsequent to production of a layer, the build platform may be repositioned by computer controller 712 along manufacturing axis 722 such that a top surface of the produced layer is aligned with the other elements of printer 710. In some examples, above step may include repositioning of print head 726 instead of or in addition to build platform 718. In some examples, the above step may be skipped.

Above steps may be repeated to produce each layer of the plurality of layers of the received digital information, until the last layer is produced. Further steps may include printing connecting bonds, gaps, apertures, pockets, channels, recesses, slots or any other physical feature as desired in the workpiece. The produced first through last layers may then comprise workpiece 728 as described in the received digital information. The workpiece may be removed from the printer and post-processed as desired. For example, the workpiece may be machined from a build plate of the build platform, and then fine details or smooth surfaces may be further finished by machining or other methods. For another example, magnets or other connectors may be installed in the workpiece.

D. Illustrative Method of Compliant Member Manufacture

This section describes steps of an illustrative method for additively manufacturing a compliant member. Aspects of an apparatus for directing fluid, including a valve structure, a poppet, a compliant member, additive manufacturing methods, and/or additive manufacturing devices previously described, may be utilized in the method steps described below. Where appropriate, reference may be made to components and systems that may be used in carrying out each step. These references are for illustration and are not intended to limit the possible ways of carrying out any particular step of the method.

Figure 8:
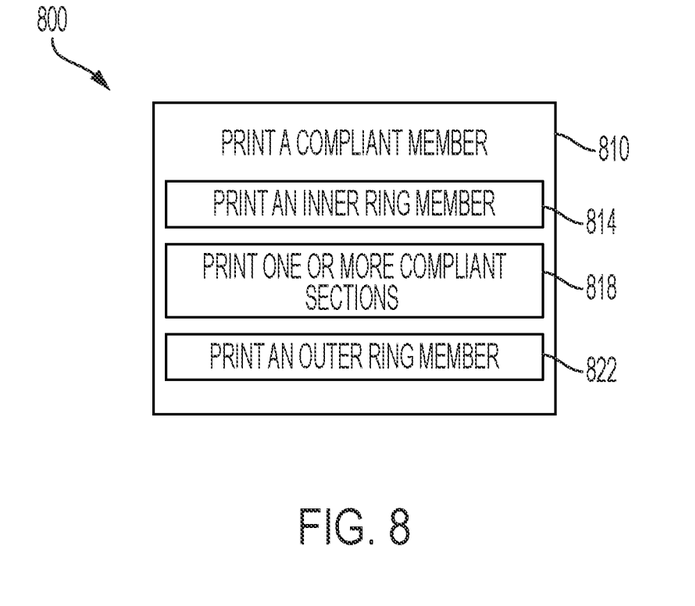
FIG. 8 is a flow chart depicting steps of a method of manufacturing a compliant member according to the present teachings.

FIG. 8 is a flowchart illustrating steps performed in an illustrative method, and may not recite the complete process or all steps of the method. FIG. 8 illustrates an example method 800 of manufacturing a compliant member 130 for use in a shuttle valve structure of a fluid flow directing apparatus.

Step 810 includes printing a compliant member. The printed compliant member may be a single unitary piece and may include inner and outer ring structures connected by one or more compliant sections. The compliant member may be configured with any desired geometry and/or any functional properties. Compliant members 130, 430, 430' described above are examples of such a compliant member.

Printing may be done according to an additive manufacturing method, as described above. In particular, printing may be done by deposition of raw material on a build platform located in a build environment. The raw material may be any material appropriate to additive manufacturing, including but not limited to a polymer such as nylon 11 or 12, or a metal such as an aluminum alloy. The compliant member may have a central axis, which may coincide with a vertical direction or manufacturing axis of the additive manufacturing method. In other words, the compliant member may be printed in a vertical direction. In some examples, the manufacturing method may include printing support structures to accommodate geometries of the compliant member that are not self-supporting.

The compliant member may include one or more adjacent compliant sections arranged radially between concentric inner and outer ring members, around the central axis. The compliant member may include a central aperture defined by the inner and outer rings, and may be described as circumferentially or peripherally surrounding the central aperture and the central axis.

The printed compliant member may be a complete compliant member, a portion of a compliant member, and/or a component of a compliant member. Method 800 may further include incorporating the structure with other un-printed or separately printed components. Method 800 may include steps to post-process the compliant member such as machining, drilling, and/or surface finishing. The method may include machining connector holes in the inner and outer ring members, and/or machining fastener holes in the inner and outer ring members to allow connection of inner and outer ring members to facilitate removal and/or reattachment of the compliant members inside the valve structure. Alternatively, method 800 may not include post-processing of the printed compliant member. The compliant member may be designed and printed such that smoothing of surface roughness, removal of sacrificial supporting material, and/or machining of additional features are not required.

Sub-step 814 of step 810 includes printing an inner ring member, which is configured to receive a movable support or a poppet structure. The inner ring member may be printed to have an appropriate geometric shape, diameter, thickness, and width configured to securely receive the poppet within the fluid flow directing apparatus.

Sub-step 818 of step 810 includes printing a plurality of compliant sections for connecting, and controlling relative movement between, inner and outer rings of a compliant member. Each compliant section may have a proximate end closest to the central axis, connected to an inner ring structure, and a distal end farthest from the central axis, and connected to an outer ring structure of a compliant member. Each compliant section may be flat, with any desired polygonal shape, including any cross-sectional shape. The compliant sections may each be directly connected to one or more adjacent compliant sections or may be spaced from one another by spacings or slits, with the compliant sections extending radially around the central axis.

Sub-step 822 of step 810 includes printing an outer ring, which is configured to be received within a stationary support or inner wall of a chamber in a valve structure. The outer ring member may be printed to have an appropriate geometric shape, diameter, thickness, and width configured to be securely received within the chamber of the fluid flow directing apparatus.

The compliant sections may be printed concurrently with the inner and outer rings. That is, steps 814, 818, and 822 may be performed simultaneously. Each layer of material deposited during printing may include a portion of the inner ring, a portion of the compliant section, and a portion of the outer ring. The inner and outer rings and the compliant sections may be printed as a single unitary monolithic structure, without joints or seams. A thickness of the printed piece or sheet may range between 0.005 to 0.2 inches. Alternatively, inner and outer ring structures may be configured for connection to interchangeable compliant sections for tuning poppet movement performance to match specific fluid flow dynamics.

Illustrative Combinations and Additional Examples

This section describes additional aspects and features of shuttle valve poppet mechanism, presented without limitation as a series of paragraphs, some or all of which may be alphanumerically designated for clarity and efficiency. Each of these paragraphs can be combined with one or more other paragraphs, and/or with disclosure from elsewhere in this application, in any suitable manner. Some of the paragraphs below expressly refer to and further limit other paragraphs, providing without limitation examples of some of the suitable combinations.

A0. An apparatus for directing fluid flow, comprising:
a valve structure having a chamber, a main port, a first port, and a second port, each of the ports being connected to the chamber,
a poppet structure in the chamber moveable between a first position blocking the first port and a second position blocking the second port, and
a first compliant member connecting the poppet structure to an inner wall of the chamber, and configured to alternate application of forces to the poppet structure, in opposite directions, between the first position and the second position.

A1. The apparatus of A0, wherein the first compliant member includes an over-center spring device.

A2. The apparatus of A0 or A1, wherein the first compliant member includes an inner ring, an outer ring, and a first compliant link connecting the inner ring to the outer ring, the inner ring being fixed to the poppet structure, and the outer ring being fixed to the inner wall of the chamber.

A3. The apparatus of A2, wherein the first compliant link alternates between forcing the poppet structure into the first position, and forcing the poppet structure into the second position.

A4. The apparatus of A2 or A3, wherein the first compliant link surrounds the poppet structure.

A5. The apparatus of A4, wherein the first compliant link has one or more slits extending radially between the inner ring and the outer ring.

A6. The apparatus of any of A2-A5, wherein the first compliant member includes a second compliant link connecting the inner ring to the outer ring.

A7. The apparatus of any of A2-A6, wherein the first compliant member includes third and fourth compliant links symmetrically connecting the inner ring to the outer ring.

A8. The apparatus of any of A2-A7, wherein at least one of the inner and outer rings is a polygon.

A9. The apparatus of any of A2-A8, wherein each of the inner and outer rings is a polygon.

A10. The apparatus of any of A2-A9, wherein the first compliant link is comprised of a polymeric material.

A11. The apparatus of any of A2-A10, wherein the first compliant link forces the inner ring to be off-set from the outer ring relative to a length of the poppet structure.

A12. The apparatus of any of A2-A11, wherein the first compliant link is configured to yield to a threshold fluid pressure level, allowing the poppet structure to move between the first position and the second position.

A13. The apparatus of any of A0-A12, further comprising:
a second compliant member connecting the poppet structure to the inner wall of the chamber, and configured to alternate application of forces to the poppet structure, in opposite directions, between the first position and the second position, wherein the first compliant member is spaced from the second compliant member along a length of the poppet structure.

A14. The apparatus of any of A0-A13, wherein the first compliant member is a single monolithic structure.

A15. The apparatus of any of A0-A14, wherein the first compliant member is additively manufactured.

B0. An apparatus for directing fluid flow, comprising:
a valve structure having a chamber, a main port, a first port, and a second port, each of the ports being connected to the chamber,
a poppet structure in the chamber moveable between a first position blocking the first port and a second position blocking the second port, and
a first over-center spring mechanism connecting the poppet structure to an inner wall of the chamber, and configured to alternate application of forces to the poppet structure, in opposite directions, between the first position and the second position.

B1. The apparatus of B0, further comprising:
a second over-center spring mechanism connecting the poppet structure to the inner wall of the chamber, and configured to alternate application of forces to the poppet structure, in opposite directions, between the first position and the second position, wherein the first over-center spring mechanism is spaced from the second over-center spring mechanism along a length of the poppet structure.

B2. The apparatus of B1, wherein the first and second spring mechanisms are configured to reverse force directions synchronously.

B3. The apparatus of B1 or B2, wherein each of the first and second over-center spring mechanisms includes a single-piece compliant member having an inner ring fixed to the poppet structure, an outer ring fixed to the inner wall of the chamber, and a compliant link connecting the inner ring to the outer ring.

B4. The apparatus of B3, wherein a stiffness of the compliant link determines a threshold level of fluid pressure required to move the poppet structure from one of the first and second positions toward the other position.

C0. A method of controlling fluid flow through a valve device, comprising:

exerting a first force on a poppet structure, maintaining the poppet structure in a first position blocking fluid flow through a first port in a chamber of a valve device, the first force being exerted by a compliant member connecting the poppet structure to an inner wall of the chamber, moving the poppet structure away from the first position toward a second position blocking fluid flow through a second port, by overcoming the first force by a counter force exerted on the poppet structure by a threshold level of fluid pressure generated by fluid flow from the first port.

Advantages, Features, and Benefits

The different examples of the shuttle valve poppet mechanism described herein provide several advantages over known solutions for operating shuttle valves. For example, illustrative examples described herein allow for a smooth and controlled shuttling of a poppet between a pair of inlet ports based on an applied fluid pressure.

Additionally, and among other benefits, illustrative examples described herein allow for selectively holding a poppet head of a poppet at a first or second inlet port of a valve without premature shuttling.

Additionally, and among other benefits, illustrative examples described herein allow for elimination of mechanical features in shuttle valve design, thus increasing the life of valves.

Additionally, and among other benefits, illustrative examples described herein allow for a control over performance of poppet mechanism.

No known system or device can perform these functions, particularly with an inexpensive material including a smaller number of lightweight parts. Thus, the illustrative examples described herein are particularly useful for shuttle valve operations. However, not all examples described herein provide the same advantages or the same degree of advantage.

Conclusion

The disclosure set forth above may encompass multiple distinct examples with independent utility. Although each of these has been disclosed in its preferred form(s), the specific examples thereof as disclosed and illustrated herein are not to be considered in a limiting sense, because numerous variations are possible. To the extent that section headings are used within this disclosure, such headings are for organizational purposes only. The subject matter of the disclosure includes all novel and nonobvious combinations and subcombinations of the various elements, features, functions, and/or properties disclosed herein. The following claims particularly point out certain combinations and subcombinations regarded as novel and nonobvious. Other combinations and subcombinations of features, functions, elements, and/or properties may be claimed in applications claiming priority from this or a related application. Such claims, whether broader, narrower, equal, or different in scope to the original claims, also are regarded as included within the subject matter of the present disclosure.

What is claimed is:

1. An apparatus for directing fluid flow, comprising:
a valve structure having a chamber, a main port, a first port, and a second port, each of the ports being connected to the chamber,
a poppet structure in the chamber moveable between a first position blocking the first port and a second position blocking the second port, and
a first compliant member connecting a first portion of the poppet structure between the first and second ports, to an inner wall of the chamber, and configured to alternate application of forces to the poppet structure, in opposite directions, between the first position and the second position, wherein the first compliant member includes an inner ring, an outer ring, and a first compliant link connecting the inner ring to the outer ring, the inner ring being fixed to the first portion of the poppet structure, and the outer ring being fixed to the inner wall of the chamber, the first compliant link alternating between forcing the poppet structure into the first position, and forcing the poppet structure into the second position.

2. The apparatus of claim 1, wherein the first compliant member includes an over-center spring device.

3. The apparatus of claim 1, wherein the first compliant link surrounds the first portion of the poppet structure.

4. The apparatus of claim 1, wherein the first compliant member includes a second compliant link connecting the inner ring to the outer ring.

5. The apparatus of claim 1, wherein the first compliant link is comprised of a polymeric material.

6. The apparatus of claim 1, wherein the first compliant link forces the inner ring to be off-set from the outer ring relative to a length of the poppet structure.

7. The apparatus of claim 1, wherein the first compliant link is configured to yield to a threshold fluid pressure level, allowing the poppet structure to move between the first position and the second position.

8. The apparatus of claim 1, further comprising:
a second compliant member connecting the poppet structure to the inner wall of the chamber, and configured to alternate application of forces to the poppet structure, in opposite directions, between the first position and the second position, wherein the first compliant member is spaced from the second compliant member along a length of the poppet structure.

9. The apparatus of claim 1, wherein the first compliant member is a single monolithic structure.

10. The apparatus of claim 1, wherein the first compliant member is additively manufactured.

11. The apparatus of claim 1, wherein of the poppet structure has opposing ends extending beyond the compliant member.

12. An apparatus for directing fluid flow, comprising:
a valve structure having a chamber, a main port, a first port, and a second port, each of the ports being connected to the chamber, a poppet structure in the chamber moveable between a first position blocking the first port and a second position blocking the second port, a first over-center spring mechanism connecting the poppet structure to an inner wall of the chamber, and configured to alternate application of forces to the poppet structure, in opposite directions, between the first position and the second position, and a second over-center spring mechanism connecting the poppet structure to the inner wall of the chamber, and configured to alternate application of forces to the poppet structure, in opposite directions, between the first position and the second position, wherein the first over-center spring mechanism is spaced from the second over-center spring mechanism along a length of the poppet structure.

13. The apparatus of claim 12, wherein each over-center spring mechanism circumferentially surrounds a portion of the poppet structure between the first and second ports.

14. The apparatus of claim 13, wherein the first and second spring mechanisms are configured to reverse force directions synchronously.

15. The apparatus of claim 13, wherein each of the first and second over-center spring mechanisms includes a single-piece compliant member having an inner ring fixed to respective portions of the poppet structure, an outer ring fixed to the inner wall of the chamber, and a compliant link connecting the inner ring to the outer ring.

16. The apparatus of claim 15, wherein a stiffness of the compliant link determines a threshold level of fluid pressure required to move the poppet structure from one of the first and second positions toward the other position.

17. A method of controlling fluid flow through a main port of a valve device, comprising:

exerting a first force on a poppet structure, maintaining the poppet structure in a first position blocking fluid flow through a first port in a chamber of a valve device, the first force being exerted by a compliant member connecting a first portion of the poppet structure between the first port and a second port, to an inner wall of the chamber, wherein the compliant member includes an inner ring, an outer ring, and a first compliant link connecting the inner ring to the outer ring, the inner ring being fixed to the first portion of the poppet structure, and the outer ring being fixed to the inner wall of the chamber, the first compliant link alternating between forcing the poppet structure into the first position, and forcing the poppet structure into the second position, moving the poppet structure away from the first position toward a second position blocking fluid flow through a second port, by overcoming the first force by a counter force exerted on the poppet structure by a threshold level of fluid pressure generated by fluid flow from the first port.

18. The method of 17, further comprising the step of:
additively manufacturing the compliant member.

19. The method of claim 18, wherein the compliant member has a second compliant link connecting the inner ring to the outer ring.

20. The method of claim 17, wherein the compliant member is a single monolithic structure.

* * * * *